UNITED STATES PATENT OFFICE 2,417,027

PROCESS FOR PREPARING CHLORINATED ANTHRAQUINONES

Viktor Weinmayr, Pitman, N. J., assignor to E. I. du Pont de Nemours & Company, Wilmington, Del., a corporation of Delaware No Drawing. Application October 28, 1943, Serial No. 508,065

2 Claims. (Cl. 260—384)

This invention relates to an improvement in the process for preparing chlorinated anthraquinones and, more particularly, to an improvement in the process for preparing chlorinated anthraquinones from anthraquinone sulfonic acids.

The conversion of anthraquinone sulfonic acids to chloroanthraquinones, which is a well-known reaction, is ordinarily carried out in dilute aqueous mineral acid solutions (sulfuric or hydrochloric acid) for the anthraquinone sulfonic acids are dilute acid and water soluble. However, due to the fact that the resulting chloroanthraquinones are water and dilute acid insoluble and are precipitated in an exceedingly fine and very bulky form, this reaction requires the use of large volumes, and because the reaction must be carried out in large volumes, the production per unit of equipment is comparatively small.

It is therefore an object of this invention to provide a process for preparing chloroanthraquinones from anthraquinone sulfonic acids which can be carried out in small reaction volumes. It is a further object of the invention to carry out the replacement of the sulfonic acid radicals in anthraquinone sulfonic acids under conditions which require a shorter reaction time than heretofore required and which also give a product of improved quality.

I have found that where the chlorination of anthraquinone sulfonic acids is carried out in water in the presence of a water immiscible organic solvent in which the chloroanthraquinones have a slight solubility, the volume of liquid media in which the reaction is carried out can be reduced to from ⅕ to ¼ the volumes normally required, thereby permitting from 4 to 5 times as great a production per unit of equipment without increasing the time or wear on the reaction vessels employed. By this process the other difficulties such as boil-overs and foaming usually experienced are also overcome.

The solvent should be one which is stable under the conditions of the reaction and which can be readily separated from the water solution and which can be readily driven off from the resulting chloroanthraquinone.

The following examples are given to illustrate the invention. The parts used are by weight except where parts by volume are specifically mentioned, in which case the volumes of the solutions mentioned correspond to the volumes of an equivalent weight of water.

*Example 1*

865 parts of anthraquinone 1,5-disulfonic acid paste as obtained from the separation of the isomeric 1,5- and 1,8-anthraquinone disulfonic acids, containing 455 parts of 100% product are dissolved in 1250 parts of water. 152 parts of 93% sulfuric acid and 250 parts of technical o-dichlorobenzene are added and the charge is heated until the reflux temperature of 105°–107° C. is reached. 1935 parts of a sodium chlorate solution (prepared by dissolving 106 parts of sodium chlorate and 116 parts of sodium chloride in water to make 1138 parts of solution) are gradually added over a period of 5–6 hours while the charge is refluxed and mechanically agitated. A precipitate begins to form after about 600 parts of the chlorate solution have been added. Heating to the boil is continued for 2–3 hours longer. The charge is then filtered while still hot and washed with hot water until acid free and until most of the o-dichlorobenzene is removed. The filter cake is dried at 100–120° C.

322 parts of 1,5-dichloroanthraquinone, equal to a yield of 94.1% of theory and of a purity of 100% by chlorine analysis is obtained.

The dry 1,5-dichloroanthraquinone thus obtained has an apparent density of 0.5 to 0.6. 1,5-dichloroanthraquinone prepared in the customary manner in the absence of o-dichlorobenzene (in which case about four times the reaction volume is needed) has an apparent density of only 0.15 to 0.2.

*Example 2*

346 parts of anthraquinone-1,5-disulfonic acid paste containing 213 parts 100% product are dissolved in 600 parts of water containing 61 parts of sulfuric acid. 300 parts of a mixture of polychlorobenzenes are added. The charge is heated to the reflux temperature of about 106° C. and kept boiling during the duration of the reaction. 630 parts of a chlorate solution as described in the preceding example are added over a period of about nine hours. During this period about 400 parts of water are removed by distillation to maintain the initial volume while the chlorobenzenes which are distilling are continuously returned.

The charge is filtered while still hot. 140 parts of a very pure 1,5-dichloroanthraquinone are obtained, equal to a yield of 87.5% of theory.

*Example 3*

218 parts of a 46% paste of 1-nitro-anthraquinone-5-sulfonic acid are dissolved in 400 parts of water. 200 parts of o-dichlorobenzene are added and the charge is heated to the boiling point. 330 parts of the chlorate solution prepared as described in Example 1 are added at 105–106° C. over a period of 6 hours. After refluxing for 3 hours longer to finish the "chlorination" the charge is allowed to cool to room temperature.

The precipitate is filtered, washed acid free and until most of the solvents is washed out. 41 parts of 1-nitro-5-chloroanthraquinone are obtained (M. R. 315–316.5° C.) equal to a yield of 96.3% of theory.

Two parts of a mixture of nitro-chloroanthraquinone and dichloroanthraquinone are isolated from the o-dichlorobenzene layer after the solvent is removed by distillation.

*Example 4*

65 parts of 1-nitro-anthraquinone-8-sodium sulfonate of a purity of 82.2% are dissolved in 200 cc. water. 65 parts of 93% sulfuric acid and 150 parts of o-dichlorobenzene are added and the charge is heated to the boil. 145 parts of a chlorate solution prepared as described before are added over a period of 7 hours. Refluxing is continued one hour longer. After cooling and filtering there are obtained 36 parts of 1,8-nitro-chloroanthraquinone, equal to a yield of 83.2% of theory.

*Example 5*

100 parts of anthraquinone-2-sodium sulfonate are heated in 400 parts of water and 100 parts of concentrated hydrochloric acid. 50 parts of nitrobenzene are added and the charge is heated to the boiling point. The conversion to 2-chloroanthraquinone in substantially 100% yield is accomplished by gradually adding a solution of 50 parts of sodium chlorate in 500 parts of water while maintaining the charge at the reflux temperature.

*Example 6*

355 parts of 2-nitro-anthraquinone-7-sodium sulfonate are suspended in 1200 parts of water containing 100 parts of concentrated hydrochloric acid. 700 parts of o-dichlorobenzene are added and the mass is heated to the boiling point. A solution of 355 parts of sodium chlorate in 3000 parts of water is added over a period of 12 hours while the charge is refluxing. 2-nitro-7-chloroanthraquinone of excellent quality is obtained in a 90% yield.

It will be obvious to those skilled in the art that the procedures given in the examples are merely to illustrate the invention and can be varied in a number of ways. The chlorination may be carried out with the use of any type of chlorinating agent normally used in the replacement of the sulfonic acid groups in the anthraquinone molecule. Other chlorinating agents than the sodium chlorate may be employed.

The solvents used may be those of the aliphatic or aromatic series. The temperature at which the dilute acid solvent mixture boils must be at least as high as the temperature required for the conversion of the anthraquinone sulfonic acids to the chloroanthraquinones. For practical purposes it is advantageous to use solvents which can be easily removed from the final product either by filtering and washing or by steam distillation. Halogenated solvents, nitro compounds, such as nitrobenzene, etc., may be used. Technical o-dichlorobenzene is the preferred solvent for this reaction.

It will be obvious that the chlorination which is ordinarily carried out at the boil may be carried out at lower temperatures, including ordinary room temperature where activated light is used to accelerate the reaction. Where the reaction is carried out at low temperatures, more volatile solvents, such as carbon tetrachloride, tetrachloroethane, etc., may be used.

The amount of solvent used may vary from one-tenth of a part to several parts by weight based on the anthraquinone sulfonic acids to be reacted. This amount will depend upon whether it is used only to increase production by decreasing the volume of dilute acid solution employed and ease of operation or whether it is employed to also effect a simultaneous purification, in which case the use of larger amounts is desirable. If an increased production in a given equipment is the principal object of the operation, we prefer to employ 0.5–0.6 part of solvent per part of anthraquinone sulfonic acid, as is illustrated in Example 1 which describes the conversion of anthraquinone-1,5-disulfonic acid to 1,5-dichloroanthraquinone.

It is not necessary that the solvent be present at the start of the reaction or that all of the solvent be used at once. Thus the solvent may be added at a later stage of the reaction when the mass becomes too thick to be heated to the boil without bumping and foaming. Within a very short time the voluminous precipitate will be converted to a coarse crystalline precipitate and the halogenation can be completed without difficulty. Instead of refluxing the charge in the presence of the solvent the latter may be added continuously or periodically in small amounts, thus constantly replacing the amount lost with the steam at the boiling or lower temperature, which procedure is operable where the reaction is carried out in vessels not equipped with reflux devices.

This invention is applicable in the replacement of sulfonic acid groups in the anthraquinone molecule which may be otherwise substituted, as illustrated in the examples, as well as in the replacement of the unsubstituted anthraquinone sulfonic acids.

The addition of the water immiscible solvent to this chlorination reaction offers many advantages over the prior art methods; for instance, where according to the prior art it is necessary to carry out the conversion of anthraquinone-1,5-disulfonic acid to 1,5-dichloroanthraquinone in a volume of from 30 to 40 parts (i. e., for each part of anthraquinone-1,5-disulfonic acid a reaction volume equal to 30–40 parts water is required), this conversion can be carried out according to the process of the present invention in volumes of 7–8 parts per part of anthraquinone sulfonic acid, thus permitting an increase in production of from 4 to 5 times that formerly obtainable per unit of equipment. The dangers of boil-overs and foaming by the addition of the organic solvent are minimized. The halogenated anthraquinones are obtained in a more compact form, requiring only a fraction of the filter space and drying space previously required; and because the solvents apparently dissolve and carry out of the reaction some impurities, the resulting halogenated anthraquinones are improved in quality. This is particularly noticeable where the larger amounts of solvents are employed. The voluminous microcrystalline product heretofore obtained is converted into a coarse crystalline product by means of the solvent, and, as illustrated in the above examples, it has an apparent density of approximately 4 times that of the previously obtained chloroanthraquinones.

I claim:

1. In the process for preparing chloroanthraquinone compounds wherein an anthraquinone sulfonic acid is reacted with a chlorinating agent in a dilute aqueous solution of a mineral acid to effect replacement of the sulfonic acid group with chlorine, the step which comprises reacting the anthraquinone sulfonic acid with the chlorinating agent in the aqueous solution to which has been added from 0.1 to about 3 parts, per part of anthraquinone sulfonic acid, of a water immiscible organic solvent of the class consisting of chlorobenzenes and nitrobenzene, the total volume of the dilute aqueous acid solvent media being from 5.5 to 13.9 parts per part of anthraquinone sulfonic acid under reaction.

2. In the process for preparing 1,5-dichloroanthraquinone wherein the anthraquinone-1,5-disulfonic acid is reacted with a chlorinating agent in a dilute mineral acid to effect replacement of the sulfonic acid group with chlorine, the step which comprises reacting the anthraquinone-1,5-disulfonic acid with the chlorinating agent in the dilute mineral acid to which has been added from 0.5 to 0.6 part of orthodichlorobenzene per part of the anthraquinone-1,5-disulfonic acid being reacted upon, the total volume of the dilute acid-organic solvent media being from 7 to 8 parts per part of anthraquinone-1,5-disulfonic acid under reaction.

VIKTOR WEINMAYR.

REFERENCES CITED

The following references are of record in the file of this patent:

UNITED STATES PATENTS

| Number | Name | Date |
|---|---|---|
| 2,128,178 | Dettwyler | Aug. 23, 1938 |
| 2,226,909 | Peter | Dec. 31, 1940 |
| 1,810,011 | Gubelmann | June 16, 1931 |
| 1,812,274 | Thomas | June 30, 1931 |

FOREIGN PATENTS

| Number | Country | Date |
|---|---|---|
| 173,166 | British | Dec. 29, 1921 |
| 1,822 | British | 1908 |
| 28,166 | British | 1911 |
| 214,714 | German | Oct. 19, 1909 |
| 68,527 | Austrian | Apr. 26, 1915 |

OTHER REFERENCES

"Solvents in Synthetic Organic Chemistry," MacArdle, 1925 (copy in Div. 6), pages 28, 151, 152, 153, 154, and 155.